United States Patent
Lee et al.

(10) Patent No.: US 9,351,336 B2
(45) Date of Patent: May 24, 2016

(54) METHOD FOR SUPPORTING COMMUNICATION USING TWO OR MORE RADIO ACCESS TECHNOLOGIES AND APPARATUS FOR SAME

(71) Applicant: LG Electronics Inc., Seoul (KR)

(72) Inventors: Eunjong Lee, Anyang-si (KR);
Heejeong Cho, Anyang-si (KR);
Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/416,994

(22) PCT Filed: Jul. 26, 2013

(86) PCT No.: PCT/KR2013/006746
§ 371 (c)(1),
(2) Date: Jan. 23, 2015

(87) PCT Pub. No.: WO2014/017875
PCT Pub. Date: Jan. 30, 2014

(65) Prior Publication Data
US 2015/0215990 A1   Jul. 30, 2015

Related U.S. Application Data

(60) Provisional application No. 61/676,312, filed on Jul. 26, 2012.

(51) Int. Cl.
*H04W 88/06* (2009.01)
*H04W 48/16* (2009.01)
(Continued)

(52) U.S. Cl.
CPC .............. *H04W 88/06* (2013.01); *H04W 48/12* (2013.01); *H04W 48/16* (2013.01); *H04W 48/18* (2013.01)

(58) Field of Classification Search
CPC ...... H04W 88/06; H04W 48/16; H04W 48/12
See application file for complete search history.

(56) References Cited

U.S. PATENT DOCUMENTS 8,289,922 B2 * 10/2012 Ewe et al. .................. 370/331
2005/0073977 A1 * 4/2005 Vanghi et al. ............... 370/335
(Continued)

FOREIGN PATENT DOCUMENTS

KR   10-2009-0034151   4/2009
KR   10-2009-0039585   4/2009
(Continued)

OTHER PUBLICATIONS

ETSI: LTE; Evolved Universal Terrestrial Radio Access (E-UTRA); Radio resource Control (RRC); Protocol specification (3GPP TS 36.331 version 10.6.0 Release 10); Technical Specification; XP-014070533; ETSI TS 136 331 v10.6.0, Jul. 2012.

*Primary Examiner* — Brandon Miller
(74) *Attorney, Agent, or Firm* — Dentons US LLP

(57) ABSTRACT

A method for supporting communication using two or more heterogeneous radio access technologies (RAT) includes the steps of: the terminal receiving a first message that includes whether to provide support to simultaneous access two or more RATs and parameters requesting that a notification be provided for the supported RAT from a base station in a first RAT network supporting a first RAT; transmitting, to the base station in the first RAT network, a second message including an indicator indicating whether to support simultaneous access to the two or more RAT networks and information on a supported RAT network type in response to the first message, wherein the supported second RAT network type corresponds to a network that is different from the first RAT network.

9 Claims, 6 Drawing Sheets

(51) Int. Cl.
*H04W 48/12* (2009.01)
*H04W 48/18* (2009.01)

(56) References Cited

U.S. PATENT DOCUMENTS

| | | | |
|---|---|---|---|
| 2010/0113024 A1* | 5/2010 | Wu | 455/436 |
| 2011/0002246 A1* | 1/2011 | Li et al. | 370/310 |
| 2011/0009130 A1* | 1/2011 | Wu | 455/456.1 |
| 2012/0190364 A1* | 7/2012 | Wu | 455/436 |

FOREIGN PATENT DOCUMENTS

| | | |
|---|---|---|
| KR | 10-2009-0088536 | 8/2009 |
| KR | 10-2012-0003114 | 1/2012 |
| WO | 2011/120577 A1 | 10/2011 |
| WO | 2012/002771 A2 | 1/2012 |
| WO | 2012/011787 A2 | 1/2012 |
| WO | 2012/033774 A2 | 3/2012 |
| WO | 2012/050387 A2 | 4/2012 |

\* cited by examiner

METHOD FOR SUPPORTING COMMUNICATION USING TWO OR MORE RADIO ACCESS TECHNOLOGIES AND APPARATUS FOR SAME

This application is a 35 USC §371 National Stage entry of International Application No. PCT/KR2013/006746 filed on Jul. 26, 2013 and claims priority to U.S. Provisional Application No. 61/676,312 filed Jul. 26, 2012, all of which are incorporated by reference in their entirety herein.

TECHNICAL FIELD

The present invention relates to a wireless communication, and more particularly, to a method of supporting signal transmission and reception using two or more radio access technologies (RAT) and an apparatus therefor.

BACKGROUND ART

There may exist a multi-RAT user equipment capable of accessing two or more radio access technologies (RATs). In order to access a specific RAT, a connection to the specific RAT is established based on a request of a user equipment and then data transmission and reception can be performed. Yet, although the multi-RAT UE is capable of accessing two or more RATs, the multi-RAT UE is unable to access multiple RATs at the same time. In particular, although a user equipment is equipped with a multi-RAT capability, the user equipment is unable to simultaneously transmit and receive data via RATs different from each other.

Until now, a concrete procedure and methods enabling a multi-RAT user equipment to simultaneously transmit and receive data via RATs different from each other are not studied yet. In order for the multi-RAT user equipment to transmit and receive data via the RATs different from each other at the same time, it is necessary to have the concrete procedure and the methods.

DISCLOSURE OF THE INVENTION

Technical Tasks

One technical task intended to achieve by the present invention is to provide a method for a user equipment to support communication using two or more radio access technologies (RATs).

Another technical task intended to achieve by the present invention is to provide a method for a base station to support communication using two or more radio access technologies (RATs).

Another technical task intended to achieve by the present invention is to provide a user equipment supporting communication using two or more radio access technologies (RATs).

The other technical task intended to achieve by the present invention is to provide a base station supporting communication using two or more radio access technologies (RATs).

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of supporting communication using two or more radio access technologies (RATs), which is supported by a user equipment, includes the steps of receiving a first message including a parameter requesting information on whether the user equipment supports simultaneous access to the two or more RATs and information on a RAT supported by the user equipment from a base station of a first RAT network supporting a first RAT and transmitting a second message including an indicator indicating whether to support simultaneous access to the two or more RAT networks and information on a type of a second RAT network supported by the user equipment to the base station of the first RAT network in response to the first message, wherein the type of the second RAT network supported by the user equipment corresponds to a heterogeneous network of the first RAT network.

The second message can further include at least one information on a base station accessed by the user equipment in the second RAT network, information on a preferred base station, or MAC (media access control) address information of the second RAT network and the method can further include the step of receiving a third message including candidate base station information of the second RAT network from the base station of the first RAT network in response to the second message. The method can further include the steps of performing scanning based on the candidate base station information and exchanging data between a base station of the second RAT network selected as a result of the scanning and the base station of the first communication network. The first message corresponds to a UECapabilityEnquiry message or an RRCConnectionRequest message and the second message may correspond to a UECapabilityInformation message or an RRCConnectionSetup message. If the first message corresponds to the UECapabilityEnquiry message, the parameter may correspond to a UE-CapabilityRequest parameter.

To further achieve these and other advantages and in accordance with the purpose of the present invention, according to a different embodiment, a method of supporting communication using two or more radio access technologies (RATs), which is supported by a base station, includes the steps of transmitting a first message including a parameter requesting information on whether a user equipment supports simultaneous access to the two or more RATs and information on a RAT supported by the user equipment to the user equipment by the base station of a first RAT network supporting a first RAT and receiving a second message including an indicator indicating whether to support simultaneous access to the two or more RAT networks and information on a type of a second RAT network supported by the user equipment from the user equipment in response to the first message, wherein the type of the second RAT network supported by the user equipment corresponds to a heterogeneous network of the first RAT network. The second message can further include at least one information on a base station accessed by the user equipment in the second RAT network, information on a preferred base station, or MAC address (media access control) information of the second RAT network and the method can further include the step of transmitting a third message including candidate base station information of the second RAT network to the user equipment in response to the second message.

To further achieve these and other advantages and in accordance with the purpose of the present invention, according to a different embodiment, a user equipment configured to support communication using two or more radio access technologies (RATs) includes a receiver, a transmitter and a processor, the processor configured to control the receiver to receive a first message including a parameter requesting information on whether the user equipment supports simultaneous access to the two or more RATs and information on a RAT supported by the user equipment from a base station of a first RAT network supporting a first RAT, the processor configured to control the transmitter to transmit a second message including an indicator indicating whether to support simultaneous access to the two or more RAT networks and information on a type of a second RAT network supported by the user equipment to the base station of the first RAT network in response to the first message and the type of the second RAT network supported by the user equipment corresponds to a heterogeneous network of the first RAT network. The processor is configured to control the receiver to further receive a third message including candidate base station information of the second RAT network from the base station of the first RAT network in response to the second message.

To further achieve these and other advantages and in accordance with the purpose of the present invention, according to a different embodiment, a base station configured to support communication using two or more radio access technologies (RATs) includes a transmitter, a receiver and a processor, the processor configured to control the transmitter to transmit a first message including a parameter requesting information on whether a user equipment supports simultaneous access to the two or more RATs and information on a RAT supported by the user equipment to the user equipment by the base station of a first RAT network supporting a first RAT, the processor configured to control the receiver to receive a second message including an indicator indicating whether to support simultaneous access to the two or more RAT networks and information on a type of a second RAT network supported by the user equipment from the user equipment in response to the first message and the type of the second RAT network supported by the user equipment corresponds to a heterogeneous network of the first RAT network.

Advantageous Effects

According to various embodiments of the present invention, it is able to make an eNB recognize a multi-RAT user equipment and perform a procedure suitable for the multi-RAT user equipment. And, in case of using a technology according to the present invention, since the eNB already knows capability of the multi-RAT user equipment, the eNB can indicate the multi-RAT user equipment to efficiently use a secondary system appropriate for the capability of the multi-RAT user equipment, thereby enhancing communication performance of the multi-RAT user equipment.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
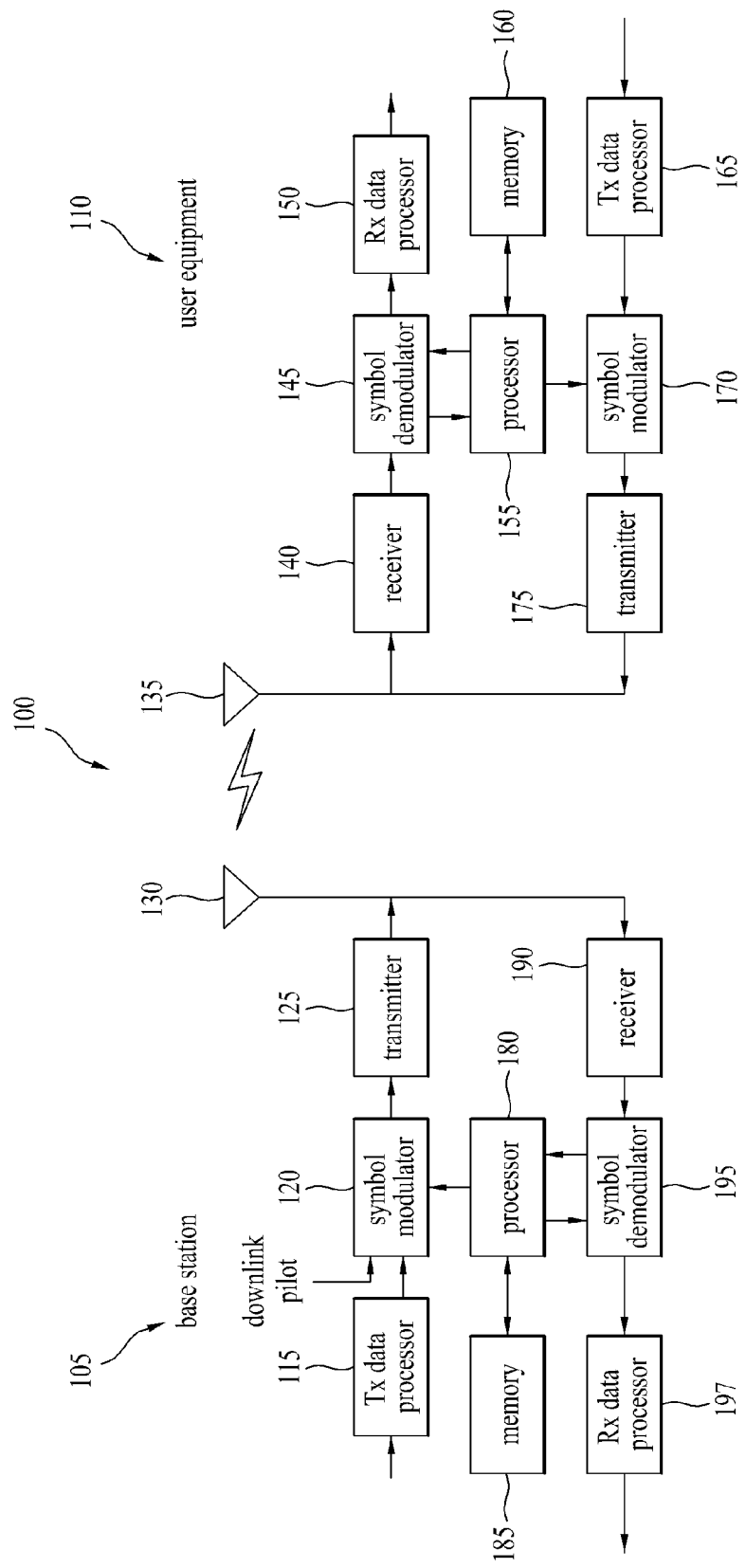
FIG. 1 is a block diagram for a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection)

model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
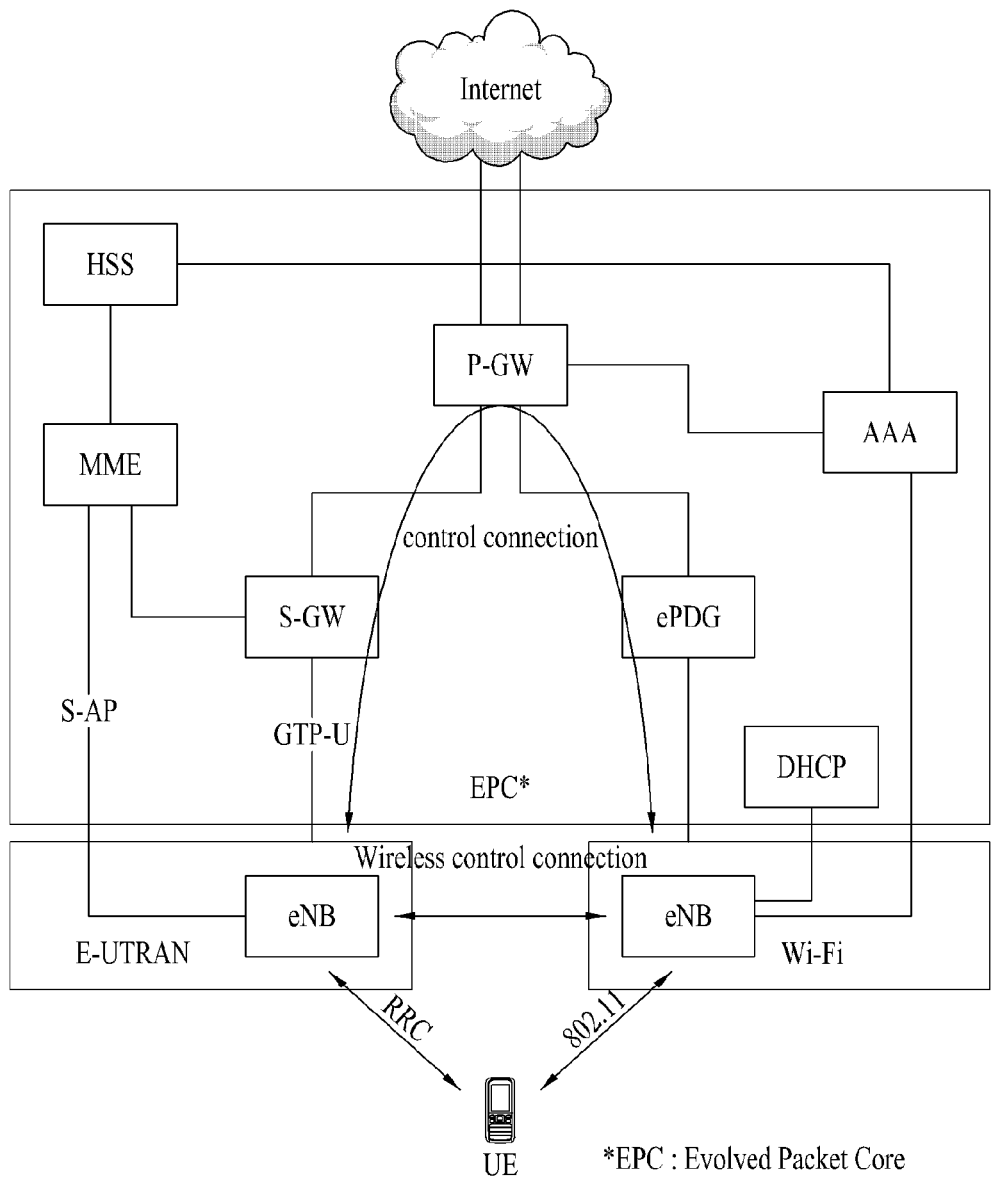
FIG. 2 is a diagram for an example of a network structure for explaining an interworking structure of a first communication system (e.g., LTE system) and a second communication system (e.g., Wi-Fi system)

FIG. 2 is a diagram for an example of a network structure for explaining an interworking structure of a first communication system (e.g., LTE system) and a second communication system (e.g., Wi-Fi system).

In a network structure shown in FIG. 2, there may exist a backhaul control connection between an AP and an eNB and a wireless control connection between the AP and the eNB via a backbone network (e.g., P-GW) or an EPC (evolved packet core). For peak throughput and data traffic off-loading, a user equipment (hereinafter abbreviated UE) can support both a first communication system (or first communication network) using a first wireless communication scheme and a second communication system (or second communication network) via interworking between a plurality of communication networks. In this case, the first communication network or the first communication system is called a primary network or a primary system and the second communication network or the second communication system can be called a secondary network or a secondary system. For instance, a UE can be configured to support LTE (or LTE-A) and Wi-Fi (a short range communication system such as WLAN/802.11) at the same time. In the present specification, the UE can be called a multi-system supporting UE (multi-system capability UE). A radio communication scheme can be commonly called a radio access technology (RAT) as well.

In a network structure shown in FIG. 2, a primary system has a wider coverage and may correspond to a network used for transmitting control information. Examples of the primary system may include WiMAX or LTE system. Meanwhile, a secondary system has a narrower coverage and may correspond to a system used for transmitting data. For instance, the secondary network may correspond to such a wireless LAN system as WLAN or Wi-Fi.

Figure 3:
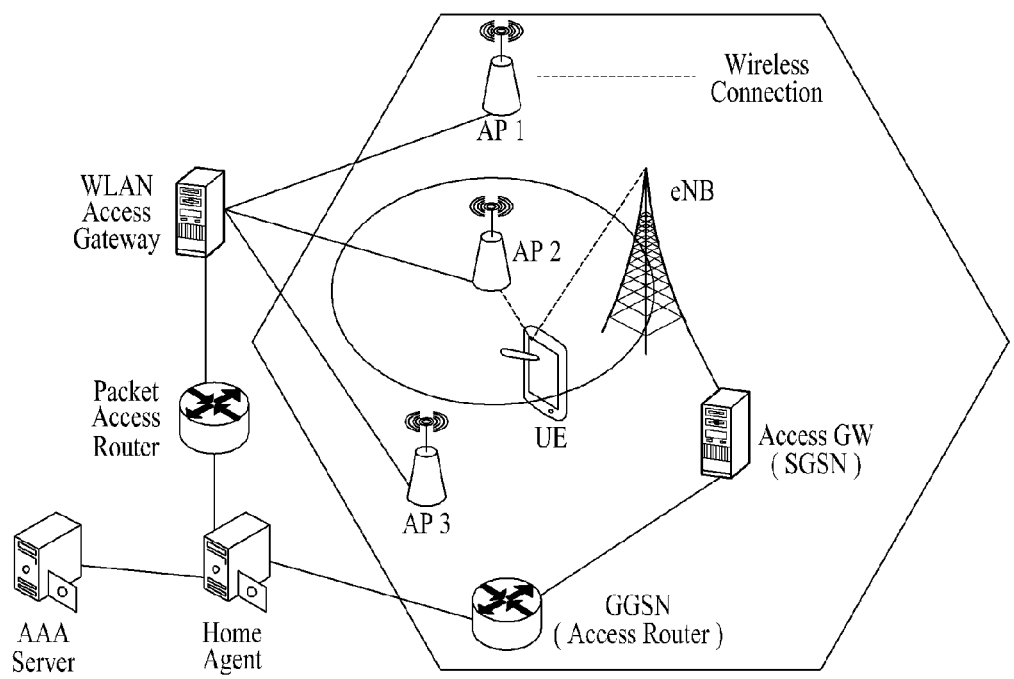
FIG. 3 is an exemplary diagram for explaining a UE request-based switching technology.

FIG. 3 is an exemplary diagram for explaining a UE request-based switching technology.

In the present specification, a user equipment capable of accessing two or more RATs at the same time is defined as a multi-RAT user equipment. In order to access a specific RAT, connection to the specific RAT is established based on a request of a user equipment and then data transmission and reception can be performed. Conventionally, although a user equipment is capable of accessing two or more RATs, the user equipment was unable to access multiple RATs at the same time. As an example, as shown in FIG. 3, when a user equipment (UE) is in a state of accessing an AP 1 in Wi-Fi network, in order for the UE to access an eNB of a cellular network, the UE should perform a switching operation and is unable to access the AP 1 and the eNB at the same time. As shown in FIG. 3, since there exists a wireless control connection between an AP and a base station, direct communication is available. In terms of the eNB, an AP of a secondary system can be seen as an entity operating in a manner of being identical to an operation of a UE equipped with an LTE capability. Meanwhile, although it is not depicted in FIG. 3, it may consider a scenario that there exists a backhaul control connection between an AP and an eNB via a backbone network. In this case, the AP and the eNB can exchange control information and the like with each other via the backhaul control connection.

In the following, a definition associated with a multi-radio access technology (multi-RAT) system to be described in the present invention is explained.

Primary System

A primary system corresponds to a system of a wider coverage. The primary system is always in a connected state with a multi system supporting UE in a network including a status (or RRC connection) or a network in DRX (discontinuous reception) or an idle status.

While a connection with a primary network is established, the multi system supporting UE can indicate that the multi system supporting UE has capability for a heterogeneous network (e.g., WLAN) to an eNB of the primary system. In this case, indication on whether multi system is supportive (multi-system capability) can be transmitted in a manner of being included in an RRCCoonectionSetup message as a new field. If the indication (e.g., WLAN Access Available or MultiRATAccessAvailable) on whether the multi system is supportive corresponds to 1, a UE and an eNB share capability necessary for a multi system with each other via a specific procedure for the multi system supporting UE.

The eNB of the primary system can periodically transmit information on other systems (secondary systems) belonging to an identical coverage via a broadcast message or a unicast message for the multi system UEs. If deployment of the secondary system changes, an updated message can be transmitted to notify addition/deletion/modification information of the secondary system.

Secondary System

A secondary system is a system of a narrower coverage. For instance, the secondary system may correspond to WLAN, Wi-Fi system. The secondary system is a system capable of being added or deleted if necessary. The secondary system can be mainly used for data transmission and reception requiring a higher bandwidth (BW). In this case, a specific flow (QoS) can be mapped.

Connection or release between a secondary system and a UE can be performed after a primary system checks the connection or the release. In this case, the connection may mean that data is ready to be transmitted or received or data is actually transmitted and received.

If a UE is detected in a coverage of a secondary system, information on the UE, which has accessed the secondary system, can be received via a primary system. In this case, actual data transmission and reception may not immediately occur.

If a UE has data to transmit and receive via a secondary system, access information on a corresponding flow can be received via a primary system. In this case, actual data transmission and reception may immediately occur.

RRC Connection Establishment

Figure 4A:
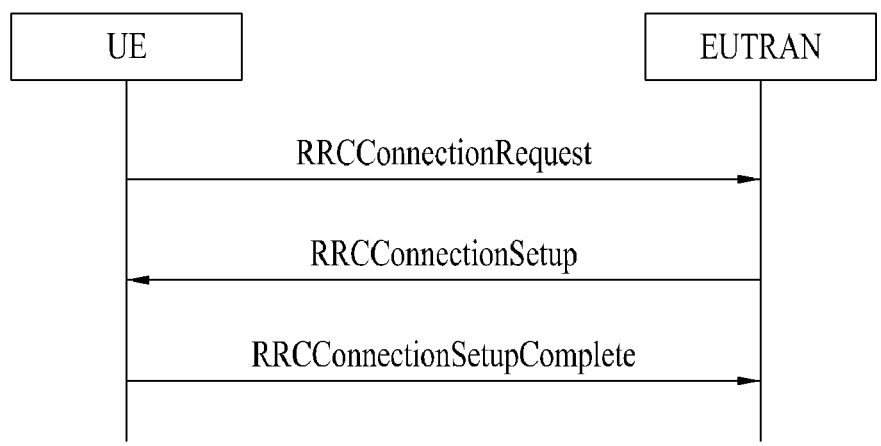
FIGS. 4a and 4b are diagrams for explaining a process related to RRC connection establishment.
Figure 4B:
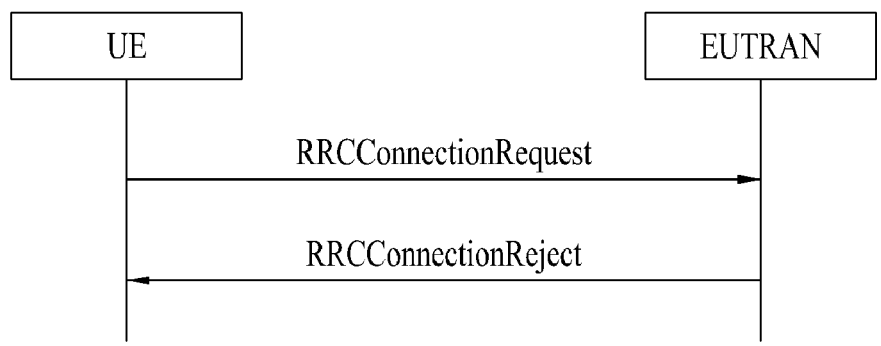

FIGS. 4a and 4b are diagrams for explaining a process related to RRC connection establishment.

A purpose of an RRC connection establishment procedure is to establish RRC connection. RRC connection establishment relates to SRB1 configuration. This procedure is also used for a UE to deliver an initial NAS-dedicated information message to E-UTRAN. FIG. 4a shows a process for a case that E-UTRAN approves an RRC connection establishment request and FIG. 4b shows a process for a case that E-UTRAN rejects the RRC connection establishment request.

As shown in FIG. 4a, a UE can transmit an RRCConnectionRequest message to E-UTRAN. The RRCConnectionRequest message includes UE-identity information and establishmentCause. If a request of the RRC connection establishment is approved, E-UTRAN transmits an RRCConnectionsetup message to the UE. Subsequently, the UE can deliver an RRCConnectionSetupComplete message to E-UTRAN. In this case, the RRCConnectionSetupComplete message can include such parameters as selectedPLMN-Identity, registeredMME mmegi mmec gummei-Type, rn-SubframeConfigReq, dedicatedlnfoNAS, rlf-Infor Available, logMeas Available and the like.

As shown in FIG. 4b, a UE can transmit an RRCConnectionRequest message to E-UTRAN. If a request of the RRC connection establishment is rejected, E-UTRAN can inform the UE of the rejection of the RRC connection establishment request in a manner of transmitting an RRCConnectionreject message to the UE.

LTE-Based UE Capability Transfer

A purpose of a UE capability transfer procedure is to deliver radio access capability information to E-UTRAN by a UE. If the UE changes E-UTRAN radio access capability, the UE should request to an upper layer to initiate a necessary NAS procedure. The NAS procedure is configured to update UE radio access capability using a new RRC connection in 3GPP TS 23.401. When (additional) UE radio access capability information is required, E-UTRAN initiates a procedure for a UE in an RRC_connected state.

Figure 5:
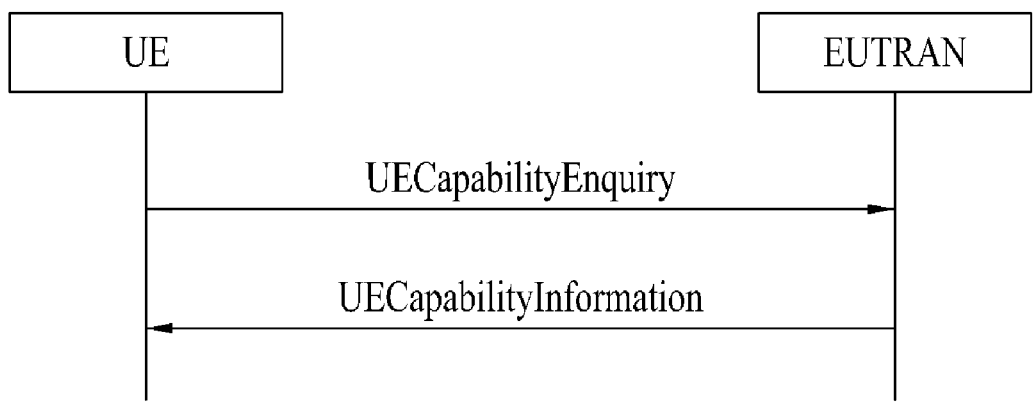
FIG. 5 is a diagram for an LTE-based UE capability transfer process.

FIG. 5 is a diagram for an LTE-based UE capability transfer process.

Referring to FIG. 5, E-UTRAN can transmit a UECapabilityEnquiry message to a UE. The UECapabilityEnquiry message corresponds to a message used for inquiring UE radio access capabilities of the UE for different RATs as well as E-UTRA (E-UTRAN). The UECapabilityEnquiry message can include UECapabilityRequest. For instance, the UECapabilityRequest can include Eutra, geran-cs, geran-ps, cdma2000-1XRTT and the like. The UE transmits information on a RAT supported by the UE to E-UTRAN via a UECapabilityInformation message in response to the UECapabilityEnquiry message. The UECapabilityInformation message includes a UE-CapabilityRAT-Container. The UE-CapabilityRAT-Container can include UE-EUTRA-Capability, UE radio access capabilities for GERAN CS, UE radio access capabilities for GERAN PS, UE radio access capabilities for UTRA, UE radio access capabilities information for CDMA2000.

A method for a base station to recognize a UE including heterogeneous capability is also required in this procedure. It is necessary to define an additional capability negotiation procedure with the UE including the heterogeneous capability. In the following description, a method capable of receiving heterogeneous network-related information of a UE in a manner that an eNB transmits a UECapabilityEnquiry message to the UE is proposed and explained. In this case, the eNB is capable of performing a heterogeneous network interworking technology such as wireless LAN. And, a capability negotiation procedure between a UE equipped with heterogeneous capability (i.e., a UE supporting a heterogeneous multi system) and a base station is explained in the following description.

Figure 6:
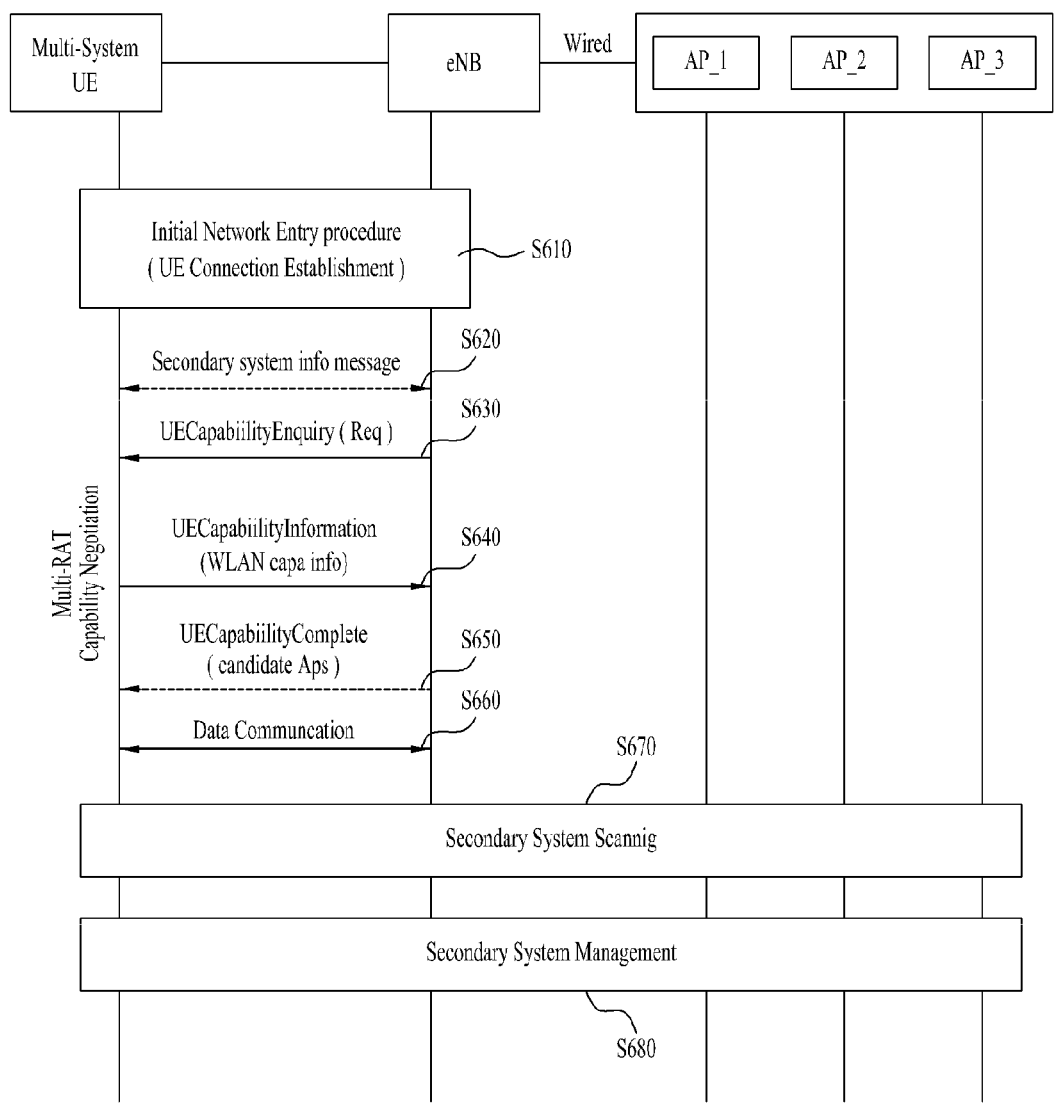
FIG. 6 is an exemplary flowchart for explaining a negotiation procedure related to multi system support according to the present invention.

FIG. 6 is an exemplary flowchart for explaining a negotiation procedure related to multi system support according to the present invention.

In particular, FIG. 6 relates to UE capability negotiation of a LTE-based UE. FIG. 6 explains a process of receiving heterogeneous network-related information of a UE by an eNB capable of performing a heterogeneous network interworking technology such as a wireless LAN in a manner that the eNB transmits a UECapabilityEnquiry message to the UE.

Referring to FIG. 6, a UE (i.e., multi-system UE) and a primary system (i.e., an eNB of the primary system) perform an initial network entry procedure [S610]. In particular, the UE performs initial connection establishment with the primary system. If the primary system corresponds to LTE system, the UE performs an initial RRC (radio resource control) connection establishment procedure of legacy LTE. In the initial network entry procedure, the UE can inform the eNB that the UE corresponds to a UE capable of supporting multiple systems or multiple radio access technologies. For instance, the UE can indicate the eNB via an RRCConnectionRequest message. Or, the UE can indicate the eNB in an RRCConnectionSetup process. The UE can indicate the eNB in a manner of additionally transmitting such a parameter (e.g., 1-bit size) as "MultiRATAccessAvailable" in the RRC-ConnectionRequest message or the RRCConnectionSetup process.

If there exist common information of a base station (hereinafter, AP) of a secondary system necessary for the UE to receive, a base station of the primary system (hereinafter, eNB) can transmit information on the secondary system to the UE [S620].

Meanwhile, unlike what is explained in the step S610 of FIG. 6, multi-system (or multi-RAT) capability negotiation of the UE can be performed after the initial connection establishment.

In case of reestablishing a connection, the multi-system (or multi-RAT) capability negotiation can be omitted. In case of making a handover, a target eNB can perform a pre-negotiation with a serving eNB via a backbone network. The eNB can store the multi-system capability of the UE for a prescribed time after the UE enters RRC_IDLE. If a network reconfiguration is performed before multi-system information retaining time elapses, the multi-system (or multi-RAT) capability negotiation can be omitted.

The eNB can transmit a message inquiring (e.g., whether the UE is capable of supporting simultaneous access to a multi-system or a multi-RAT, whether the UE is capable of supporting simultaneous access to a system or a RAT) capability of the UE to the UE [S630]. The message can be called a "UECapabilityEnquiry" (Req) message. A UE-CapabilityRequest parameter is added to the UECapabilityEnquiry message and the added parameter is transmitted in a manner of including content inquiring whether the UE is capable of supporting the multi-system or the multi-RAT at the same time and/or whether the UE is capable of supporting a prescribed system. The UE-CapabilityRequest parameter can be transmitted in a manner of including a parameter on a new radio access technology (RAT) (i.e., unlicensed band) such as Wi-Fi, WLAN or 802.11.

The UE transmits a UECapabilityInformation message to the eNB in response to the UECapabilityEnquiry message [S640]. For instance, the UECapabilityInformation message may include WiFi-related capability information. The UECapabilityInformation message can include an indicator indicating whether the UE supports access to a plurality of radio access technologies or a system type at the same time and information on a radio access technology and a system type capable of being supported. For instance, if the radio access technology capable of being supported corresponds to WiFi, the UECapabilityInformation message can additionally include 802.11 MAC address of the UE for authentication information. And, the UECapabilityInformation message can include previously accessed AP information (UE's preferred AP). It is preferable to transmit the previously accessed AP information to an eNB to which the previously accessed AP belongs only. And, the UECapabilityInformation message can additionally include protocol version (11a/b/n . . . ) information as Wi-Fi-related capability information. Having received the UECapabilityInformation message, the eNB can obtain information on a radio access technology of the UE capable of being supported at the same time or information on a system type.

As mentioned in the foregoing description, when the UECapabilityInformation message and the UECapabilityInformation message are exchanged between the UE and the eNB, it is necessary to additionally add contents shown in Table 1 in the following to a legacy standard specification 3GPP TS 36.331.

TABLE 1

5.6.3.3 Reception of the UECapabilityEnquiry by the UE (3GPP TS 36.331) 에 아래 내용추가

The UE shall:
1> set the contents of UECapabilityInformation message as follows:
2>   if the ue-CapabilityRequest includes wifi and if the UE supports WiFi (or WLAN or 802.11x) domain:
3>   include the UE radio access capabilities for WiFi within a ue-CapabilityRAT-Container and with the rat-Type set to WiFi(or WLAN or 802.11x);
1> submit the UECapabilityInformation message to lower layers for transmission, upon which the procedure ends Having received the radio access technology or the system type information capable of being supported from the UE via the UECapabilityInformation message, the eNB transmits a UECapabilityComplete message or a UECapabilityResponse message to the UE [S650]. The UECapabilityComplete message or the UECapabilityResponse message can include candidate APs information.

In case of FIG. 6, the UE transmits the UECapabilityInformation message (2 step) only when the legacy UECapabilityEnquiry message is transmitted (1 step). In this case, the eNB can transmit the UECapabilityComplete message in response to the UECapabilityInformation message (3 step). This is an optional process. Hence, the multi-RAT capability negotiation procedure can consist of 2 or 3 steps. In particular, the step S620 and the step S650 shown in FIG. 6 by dotted lines can be optionally performed.

Meanwhile, the multi-RAT capability negotiation procedure can consist of 1 or 2 steps. The UECapabilityInformation message can be transmitted to the eNB using an unsolicited scheme without the legacy UECapabilityEnquiry message on the basis of determination of the UE (1 step). In this case, the eNB may transmit the UECapabilityComplete message to the UE in response to the UECapabilityInformation message. This step can be optionally performed as well. In particular, in this scenario, the step S630 can also be optionally performed as well as the step S620 and the step S650 depicted as the dotted lines.

After the step S650, the UE can exchange data with the eNB [S660] and can select an AP by performing a secondary system scanning based on a candidate AP list (or APs) received in the step S650 [S670]. After the scanning is performed, the UE can perform secondary system management [S680].

According to various embodiments of the present invention, it is able to make an eNB recognize a multi-RAT UE and perform a procedure suitable for the multi-RAT UE. And, in case of using a technology according to the present invention, since the eNB already knows capability of the multi-RAT UE, the eNB can indicate the multi-RAT UE to efficiently use a secondary system appropriate for the capability of the multi-RAT UE, thereby enhancing communication performance of the multi-RAT UE.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of supporting communication using two or more radio access technologies (RATs) by a user equipment, the method comprising:
  receiving a first message containing a query on whether the user equipment can support simultaneous access to the two or more RATs and containing information on a RAT supported by the user equipment, from a base station of a first RAT network supporting a first RAT;
  transmitting a second message to the base station of the first RAT network in response to the first message, the second message containing an indicator indicating the user equipment can support simultaneous access to the two or more RAT networks and information on a type of second RAT network supported by the user equipment to the base station of the first RAT network in response to the first message; and
  receiving simultaneously data from the base station of the first RAT network and from a selected base station of the second RAT network supported by the user equipment, the selected base station of the second RAT network being selected by the user equipment, wherein the second RAT network and the first RAT network are heterogeneous with respect to each other.

2. The method of claim 1, wherein the second message further includes at least one information on a previous base station accessed by the user equipment in the second RAT network, information on a preferred base station in the second RAT network, or MAC (media access control) address of the user equipment for authenticating in the second RAT network.

3. The method of claim 1, further comprising:
receiving a third message containing candidate base station information of the second RAT network from the base station of the first RAT network in response to the second message.

4. The method of claim 3, further comprising:
performing scanning based on the candidate base station information; and
selecting the base station of the second RAT network based on the scanning.

5. The method of claim 1, wherein the first message corresponds to a UECapabilityEnquiry message or an RRCConnectionRequest message and wherein the second message corresponds to a UECapabilityInformation message or an RRCConnectionSetup message.

6. The method of claim 5, wherein if the first message corresponds to the UECapabilityEnquiry message, the parameter corresponds to a UE-CapabilityRequest parameter.

7. The method of claim 6, wherein if the first message corresponds to the RRCConnectionRequest message, the parameter corresponds to a MultiRATAccessAvailable parameter.

8. A user equipment configured to support communication using two or more radio access technologies (RATs), the user equipment comprising:
a receiver;
a transmitter; and
a processor configured to control:
the receiver to receive a first message containing a query whether the user equipment can support simultaneous access to the two or more RATs and containing information on a RAT supported by the user equipment from a base station of a first RAT network supporting a first RAT;
the transmitter to transmit a second message containing an indicator indicating whether the user equipment can support simultaneous access to the two or more RAT networks and information on a type of second RAT network supported by the user equipment to the base station of the first RAT network in response to the first message; and
the receiver to receive simultaneously data from the base station of the first RAT network and from a selected base station of the second RAT network supported by the user equipment, the selected base station of the second RAT network being selected by the user equipment,
wherein the second RAT network and the first RAT network are heterogeneous with respect to each other.

9. The user equipment of claim 8, wherein the processor is configured to control the receiver to further receive a third message containing candidate base station information of the second RAT network from the base station of the first RAT network in response to the second message.

* * * * *